(12) United States Patent
Suddaby

(10) Patent No.: US 6,369,154 B1
(45) Date of Patent: Apr. 9, 2002

(54) COMPOSITIONS SUITABLE FOR MAKING ELASTOMERIC ARTICLES OF MANUFACTURE

(75) Inventor: Kevin Grant Suddaby, Morrisville, NC (US)

(73) Assignee: Reichhold, Inc., Durham, NC (US)

(*) Notice: Subject to any disclaimer, the term of this patent is extended or adjusted under 35 U.S.C. 154(b) by 0 days.

(21) Appl. No.: 09/360,902

(22) Filed: Jul. 26, 1999

(51) Int. Cl.$^7$ .............................................. C08L 33/06
(52) U.S. Cl. ...................................................... 524/560
(58) Field of Search ............................................ 524/560

(56) References Cited

U.S. PATENT DOCUMENTS

| | | | |
|---|---|---|---|
| 2,527,162 A | 10/1950 | Vanderbilt et al. | 260/80.7 |
| 2,574,894 A | 11/1951 | Synder et al. | 260/84.3 |
| 2,575,135 A | 11/1951 | Schulze et al. | 260/84.1 |
| 2,891,039 A | 6/1959 | Kolb et al. | 260/78.5 |
| 2,959,821 A | 11/1960 | Kolb | 18/58.6 |
| 3,047,548 A | 7/1962 | Garret | 260/80.7 |
| 3,174,953 A | 3/1965 | Ogle | 260/83.7 |
| 3,190,765 A | 6/1965 | Yuan | 117/63 |
| 3,223,663 A | 12/1965 | Altobelli et al. | 524/269 |
| 3,256,234 A | 6/1966 | Miller | 260/29.7 |
| 3,505,156 A | 4/1970 | Handscomb et al. | 161/67 |
| 3,505,256 A | 4/1970 | Handscomb et al. | 161/67 |
| 3,650,664 A | 3/1972 | De Graff et al. | 524/564 |
| 3,860,441 A | 1/1975 | Vaughn et al. | 117/65.2 |
| 3,878,151 A | 4/1975 | Dachs et al. | 526/271 |
| 4,072,794 A | 2/1978 | Tomita et al. | 428/378 |
| 4,217,395 A * | 8/1980 | Kuan | 428/494 |
| 4,237,249 A | 12/1980 | Balzer et al. | 526/209 |
| 4,251,581 A | 2/1981 | Schoppa et al. | 428/95 |
| 4,265,977 A * | 5/1981 | Kawamura | 428/511 |
| 4,309,179 A | 1/1982 | Heuser et al. | 8/558 |
| 4,331,572 A | 5/1982 | Tomasi et al. | 524/238 |
| 4,436,857 A * | 3/1984 | Kuan | 524/260 |
| 4,503,191 A | 3/1985 | Stakelbeck | 524/159 |
| 4,613,531 A * | 9/1986 | Sekiya | 523/201 |
| 4,767,803 A * | 8/1988 | Yasui | 523/335 |
| 4,808,459 A | 2/1989 | Smith et al. | 428/95 |
| 4,836,828 A | 6/1989 | Hussamy | 8/594 |
| 4,857,566 A * | 8/1989 | Helbling | 523/409 |
| 4,876,293 A | 10/1989 | Durney et al. | 523/122 |
| 4,879,364 A | 11/1989 | Stanislawczyk | 526/318.2 |
| 4,963,623 A | 10/1990 | Miller et al. | 525/237 |
| 5,014,362 A | 5/1991 | Tillotson et al. | 2/168 |
| 5,026,765 A | 6/1991 | Katz et al. | 524/561 |
| 5,039,750 A | 8/1991 | Miller et al. | 525/237 |
| 5,045,611 A | 9/1991 | McNeil | 526/81 |
| 5,061,765 A | 10/1991 | Hsu | 526/141 |
| 5,081,178 A | 1/1992 | Angel | 524/521 |
| 5,084,514 A | 1/1992 | Suczechura et al. | 525/123 |
| 5,093,449 A * | 3/1992 | Cronin | 526/318 |
| 5,102,424 A | 4/1992 | Karsunky et al. | 8/490 |
| 5,143,971 A | 9/1992 | Stanislawczyk | 526/318.2 |
| 5,177,164 A | 1/1993 | De Vries et al. | 526/82 |
| 5,195,537 A | 3/1993 | Tillotson | 128/844 |
| 5,206,319 A | 4/1993 | Kobayashi et al. | 526/224 |
| 5,284,157 A | 2/1994 | Miller et al. | 128/844 |
| 5,284,607 A | 2/1994 | Chen | 264/37 |
| 5,294,384 A | 3/1994 | David et al. | 264/37 |
| 5,338,565 A | 8/1994 | Shlenker et al. | 427/2.25 |
| 5,370,900 A | 12/1994 | Chen | 427/2.3 |
| 5,378,755 A | 1/1995 | Krishnan et al. | 524/555 |
| 5,403,640 A | 4/1995 | Krishnan et al. | 428/96 |
| 5,405,666 A | 4/1995 | Brindle | 428/36.4 |
| 5,444,118 A | 8/1995 | Tsusuoka et al. | 524/833 |
| 5,484,840 A | 1/1996 | Binkley | 524/501 |
| 5,502,138 A | 3/1996 | Krishnan et al. | 526/273 |
| 5,505,999 A | 4/1996 | Krishnan et al. | 427/389.9 |
| 5,514,763 A | 5/1996 | Kmiecik-Lawrynowicz et al. | 526/340 |
| 5,684,052 A | 11/1997 | Krishnan et al. | 521/40.5 |
| 5,700,852 A | 12/1997 | Iwanaga | 524/460 |
| 5,728,340 A | 3/1998 | Dreibelbis et al. | 264/216 |
| 5,861,212 A * | 1/1999 | Mori | 428/375 |
| 5,910,533 A | 6/1999 | Ghosal et al. | 524/560 |
| 5,922,780 A * | 7/1999 | Dyer | 521/150 |

FOREIGN PATENT DOCUMENTS

| | | |
|---|---|---|
| CA | 795706 | 2/1956 |
| EP | 0 048 950 | 4/1982 |
| EP | 0429932 A2 | 6/1991 |
| EP | 0496925 A1 | 8/1992 |
| EP | 0 744 418 | 11/1996 |
| GB | 935420 | 8/1963 |
| GB | 1 220 384 | 1/1971 |
| JP | 60-235874 | 11/1985 |
| JP | 3229703 | 10/1991 |
| SU | 1781237 | 12/1992 |

OTHER PUBLICATIONS

Reichhold Product Bulletin (Jan. 1993).
Abstract, Derwent Publications Ltd., AN 85–035394, London, Great Britain, Dec. 24, 1984.

* cited by examiner

*Primary Examiner*—Paul R. Michl
(74) *Attorney, Agent, or Firm*—Myers Bigel Sibley & Sajovec, P.A.

(57) ABSTRACT

The present invention provides a polymer latex composition. The composition includes from about 35 to about 80 weight percent of aliphatic conjugated diene monomer, from about 10 to about 65 weight percent of unsaturated ester or amide monomer, and above 0 to about 15 weight percent of unsaturated acid monomer.

16 Claims, No Drawings

COMPOSITIONS SUITABLE FOR MAKING ELASTOMERIC ARTICLES OF MANUFACTURE

FIELD AND BACKGROUND OF THE INVENTION

The present invention relates to polymer latex compositions useful in making elastomeric articles of manufacture, and more particularly composition useful in making an article of manufacture from a crosslinkable film having improved aging and ozone resistance properties, and other advantages over natural rubber.

Articles of manufacture such as gloves, condoms, bags, and the like are formed of latex polymeric materials, and are useful in a wide variety of applications relating to, for example, medical, industrial and household uses. These polymeric materials are generally water-based polymers which are readily formed using commercially-known processes. In such processes, it is important that the latex material be able to form a film on the surface of a mold. An example of such use relates to the making of latex gloves, especially for medical applications. Latex gloves are preferred since they can be made light, thin, flexible, tight-fitting, and substantially impermeable to a variety of liquids and gases. It is often desirable that the gloves possess adequate physical properties such as tensile strength and elongation, and are comfortable to the wearer.

It is also desirable that the gloves possess adequate aesthetic properties with respect to drape, softness, etc., provide a good barrier to microbial penetration, and be substantially odorless. A combination of high tensile strength and elongation combined with a low modulus is typically preferred. In addition to the above, it is desirable that the glove have sufficient snap or elastic recovery.

Conventional latex gloves have typically been formed of natural rubber primarily due to their resiliency, softness, adequate physical properties, and good elastic recovery. Nonetheless, many wearers of such gloves are allergic to proteins found in natural rubber. These individuals often experience difficulty when wearing the gloves. As a result, there have been efforts to develop gloves made from synthetic materials which are comparable to the natural rubber gloves in terms of comfort and physical properties. One synthetic alternative focuses on using poly(vinylchloride) (PVC). PVC is typically plasticized in order to be pliable enough to use in glove applications. Gloves formed from PVC are undesirable in many respects. For example, the gloves do not possess a soft and rubbery feel. Furthermore, the plasticizer may migrate through the PVC and leach out when in contact with solvents. Also, it is believed that synthetic gloves formed from vinyl materials may provide an insufficient barrier to microbes due to imperfections in the film. Additionally, these gloves tend to display inadequate elastic recovery (snap) properties and poor softness.

Another possible alternative to gloves made of natural rubber is described in U.S. Pat. No. 5,014,362 to Tillotson et al. The Tillotson et al. patent proposes gloves made with elastomeric material which are claimed to possess adequate physical properties relating to fluid permeability, strength, and resilience. The gloves are taught to be formed from a nitrile-containing rubber, more particularly a carboxylated nitrile containing butadiene rubber. Nitrile-containing rubber gloves are typically desirable in demanding end use applications, such as those which often require superior properties such as solvent and puncture resistance.

Another alternative is proposed in U.S. Pat. No. 5,910,533 to Ghosal et al. The Ghosal et al. patent proposes a latex composition for gloves having a relatively high (i.e. 80 to 99 percent by weight) amount of a conjugated diene monomer, and in addition includes an unsaturated acid monomer and an additional unsaturated monomer.

Although these various lattices provide articles of manufacture having high tensile strength and elongation properties, there continues to be a need for articles of manufacture having improved aging and resistance to ozone properties. There are also applications where the use of synthetic elastomers are desirable, but where the properties conferred by styrene, acrylonitrile or chloroprene or derivatives thereof are unnecessary or undesirable or both.

SUMMARY OF THE INVENTION

To these ends and other objects and advantages, the present invention provides a polymer latex composition. The latex composition comprises from about 35 to about 80 weight percent of aliphatic conjugated diene monomer; from about 10 to about 65 weight percent of unsaturated ester or amide monomer and, above 0 to about 15 weight percent of unsaturated acid monomer. By lowering the amount of the aliphatic conjugated diene monomer as compared to, for example, the amount proposed by Ghosal et al., improved aging and ozone resistance properties can result.

The latex in one embodiment is devoid of styrene, acrylonitrile and chloroprene and derivatives thereof. The latex can be formed into a crosslinked film, and utilized to manufacture a number of so-called "dipped goods" such as articles including gloves, condoms, bags and the like. For example, the polymer latex can be contacted with a mold in the shape of the article and then cured to form the article. It is believed that high levels of conjugated diene monomers lead to high levels of residual unsaturation in the polymer chain which can result in undesirable properties such as poor aging and poor ozone resistance.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The latex composition comprises from about 35 to 80 weight percent, preferably from about 45 to about 70 weight percent of aliphatic conjugated diene monomer, from about 10 to about 65 weight percent, preferably from about 20 to about 40 weight percent of unsaturated ester or amide monomer, and above 0 to about 15 weight percent, preferably about 2 to 7 weight percent of unsaturated acid monomer. Blends or copolymers of the monomers may be used.

Suitable conjugated diene monomers that may be used include, but are not limited to $C_4$ to $C_9$ dienes such as, for example, butadiene monomers such as 1,3-butadiene, 2-methyl-1,3-butadiene, and the like. Blends or copolymers of the diene monomers can also be used. A particularly preferred conjugated diene is 1,3-butadiene.

The unsaturated ester or amide monomers which may be used are well known and include, for example, acrylates, methacrylates, acrylamides and methacrylamides and derivatives thereof. The acrylic and methacrylic acid derivatives may include functional groups such as amino groups, hydroxy groups, epoxy groups and the like. Exemplary acrylates and methacrylates include, but are not limited to, various (meth)acrylate derivatives including, methyl methacrylate, ethyl methacrylate, butyl methacrylate, glycidyl methacrylate, hydroxyethyl methacrylate, hydroxypropyl methacrylate, hydroxybutyl methacrylate, 3-chloro-2-hydroxybutyl methacrylate, 2-ethylhexl(meth)acrylate, dimethylaminoethyl(meth)acrylate and their salts, diethylaminoethyl(meth)acrylate and their salts, acetoacetoxyethyl(meth)acrylate, 2-sulfoethyl(meth) acrylate and their salts, methoxy polyethylene glycol mono (meth)acrylate, polypropylene glycol mono(meth)acrylate, tertiarybutyl aminoethyl (meth)acrylate and their salts, benzyl(meth)acrylate, 2-phenoxyethyl(meth)acrylate, gamma-methacryloxypropyltrimethoxysilane, propyl(meth) acrylate, isopropyl(meth)acrylate, isobutyl (meth)acrylate, tertiarybutyl (meth)acrylate, isobornyl (meth)acrylate, isodecyl(meth)acrylate, cyclohexyl(meth)acrylate, lauryl (meth)acrylate, methoxyethyl (meth)acrylate, hexyl (meth) acrylate, stearyl(meth)acrylate, tetrahydrofufuryl(meth) acrylate, 2(2-ethoxyethoxy), ethyl(meth)acrylate, tridecyl (meth)acrylate, caprolactone(meth)acrylate, ethoxylated nonylphenol(meth)acrylate, propoxylated allyl(meth) acrylate and the like. Other acrylates include methyl acrylate, ethyl acrylate, butyl acrylate, glycidyl acrylate, hydroxyethyl acrylate, hydroxypropyl acrylate, and hydroxybutyl acrylate.

Exemplary (meth)acrylamide derivatives include, but are not limited to, acrylamide, N-methyolacrylamide, N-methyolmethacrylamide, 2-acrylamido-2-methylpropanesesulfonic acid, methacrylamide, N-isopropylacrylamide, tert-butylacrylamide, N-N'-methylene-bis-acrylamide, N,N-dimethylacrylamide, methyl-(acrylamido) glycolate, N-(2,2 dimethoxy-1-hydroxyethyl) acrylamide, acrylamidoglycolic acid, alkylated N-methylolacrylamides such as N-methoxymethylacrylamide and N-butoxymethylacrylamide Suitable dicarboxylic ester monomers may also be used such as, for example, alkyl and dialkyl fumarates, itaconates and maleates, with the alkyl group having one to eight carbons, with or without functional groups. Specific monomers include diethyl and dimethyl fumarates, itaconates and maleates. Other suitable ester monomers include di(ethylene glycol) maleate, di(ethylene glycol) itaconate, bis(2-hydroxyethyl) maleate, 2-hydroxyethyl methyl fumarate, and the like. The mono and dicarboxylic acid ester and amide monomers may be blended or copolymerized with each other.

Ester and amide monomers which may be used in the polymer latex composition also include, for example, partial esters and amides of unsaturated polycarboxylic acid monomers. These monomers typically include unsaturated di- or higher acid monomers in which at least one of the carboxylic groups is esterified or aminated. One example of this class of monomers is of the formula RXOC—CH=CH—COOH wherein R is a $C_1$ to $C_{18}$ aliphatic, alicyclic or aromatic group, and X is an oxygen atom or a NR' group where R' represents a hydrogen atom or R group. Examples include, but are not limited to, monomethyl maleate, monobutyl maleate and monooctyl maleate. Partical esters or amides of itaconic acid having $C_1$ to $C_{18}$ aliphatic, alicyclic or aromatic groups such as monomethyl itaconate can also be used. Other mono esters, such as those in which R in the above formula is an oxyalkylene chain can also be used. Blends or copolymers of the partial esters and amides of the unsaturated polycarboxylic acid monomer can also be used.

A number of unsaturated acid monomers may be used in the polymer latex composition. Exemplary monomers of this type include, but are not limited to, unsaturated mono- or dicarboxylic acid monomers such as acrylic acid, methacrylic acid, itaconic acid, fumaric acid, maleic acid, and the like. Derivatives, blends, and mixtures of the above may be used. Methacrylic acid is preferably used. Partial esters and amides of unsaturated polycarboxylic acids in which at least one carboxylic group has been esterfied or aminated may also be used.

In one embodiment, the latex composition is devoid of styrene, acrylonitrile, chloroprene and their derivatives. In accordance with another embodiment, the polymer latex composition may include additional monomers. The additional unsaturated monomer may be employed for several reasons. For example, the additional monomers may aid in processing, more specifically, help to reduce the time of polymerization of the latex. The presence of the additional unsaturated monomer may also help in enhancing the physical properties of a film, glove, or other article containing the polymer latex composition. A number of unsaturated monomers may be used and are well known to the skilled artisan. Examples include, but are not limited to, nitrile-containing monomers and aromatic monomers. Mixtures of the above may be used. The additional unsaturated monomer may be used from about 0 to about 15 percent based on the weight of the monomers. Nitrile-containing monomers which may be employed include, for example, acrylonitrile, fumaronitrile and methacrylonitrile. Blends and mixtures of the above may be used.

For the purposes of the invention, the term "aromatic monomer" is to be broadly interpreted and include, for example, aryl and heterocyclic monomers. Exemplary aromatic vinyl monomers which may be employed in the polymer latex composition include styrene and styrene derivatives such as alpha-methyl styrene, p-methyl styrene, vinyl toluene, ethylstyrene, tert-butyl styrene, monochlorostyrene, dichlorostyrene, vinyl benzyl chloride, vinyl pyridine, vinyl naphthalene, fluorostyrene, alkoxystyrenes (e.g., p-methoxystyrene), and the like, along with blends and mixtures thereof.

The polymer latex composition may also include other components such as, for example, urethanes, epoxies, styrenic resins, acrylic resins, melamine-formaldehyde resins, and conjugated diene polymers (e.g., polybutadiene, styrene-butadine rubbers, nitrile butadiene rubbers, polyisoprene, and polychloroprene). Blends, derivatives, and mixtures thereof may also be used.

Conventional surfactants and emulsifying agents can be employed in the polymer latex composition. Polymerizable surfactants that can be incorporated into the latex also can be used. For example, anionic surfactants can be selected from the broad class of sulfonates, sulfates, ethersulfates, sulfosuccinates, and the like, the selection of which will be readily apparent to anyone skilled in the art. Nonionic surfactants may also be used to improve film and glove characteristics, and may be selected from the family of alkylphenoxypoly(ethyleneoxy)ethanols where the alkyl group typically varies from $C_7$–$C_{18}$ and the ethylene oxide units vary from 4–100 moles. Various preferred surfactants in this class include the ethoxylated octyl and nonyl phenols. Ethoxylated alcohols are also desirable surfactants. A typical anionic surfactant is selected from the diphenyloxide disulfonate family, such as benzenesulfonic acid, dodecyloxydi-, disodium salt. In addition to, or in place of the surfactants, a polymeric stabilizer may be used in the composition of the invention.

The polymer can include crosslinking agents and other additives, the selection of which will be readily apparent to one skilled in the art. Exemplary crosslinking agents include vinylic compounds (e.g., divinyl benzene); allyllic compounds (e.g., allyl methacrylate, diallyl maleate); and multifunctional acrylates (e.g., di, tri and tetra (meth)acrylates), sulfur, metal complexes, metal salts, and metal oxides (e.g., zinc oxide). Peroxides may also be used. Additional ingredients which may be used include, but are not limited to, chelating agents (e.g., ethylendiaminetetraacetic acid), dispersants (e.g., salts of condensed naphthalenesulfonic acid); buffering agents (e.g., ammonium hydroxide); and polymerization inhibitors (e.g., hydro uinone). Chain transfer agents (e.g., carbon tetrachloride, butyl mercaptan, bromotrichloromethane and t-dodecyl mercaptan) may also be used in the invention, preferably less than about 2 percent based on the weight of the monomers. More preferably, the chain transfer agent is used from about 0.0 to about 1.5 weight percent, and most preferably from about 0.3 to about 1.0 weight percent.

The monomers used in forming the polymer latex composition of the invention may be polymerized in a manner known to those who are skilled in the art. For example, the monomers may be polymerized at a temperature preferably between about 5° C. and 95° C., and more preferably between about 10° C. and 70° C.

The invention also relates to a crosslinked film formed from a polymer latex composition described herein. Numerous articles of manufacture can be formed from the crosslinked film and polymer latex composition according to the process of the invention. Such latex articles generally include those which are typically made from natural rubber and which contact the human body.

The films can be made into self-supported or form stable articles. The films are mechanically self-supporting without significant deformation, i.e., it can maintain its dimensions (e.g., length, thickness, circumference, etc.) against gravity without any exterior support such as a mold. It is recognized by those skilled in the art, the article could be supported, e.g., lined if additional support is desired. Exemplary articles of manufacture include, but are not limited to, gloves, condoms, medical devices, catheter tubes, bags, balloons, and blood pressure bags. Exemplary techni ues are described in U.S. Pat. No. 5,084,514 to Szczechura et al., the disclosure of which is incorporated by reference herein in its entirety.

Typically, the polymer latex composition is prepared by emulsion polymerization. The composition can be compounded with one or more crosslinkers (e.g., metal oxides such as zinc oxide, sulfur, and peroxides), along with antioxidants, fillers, and other ingredients. The compounding or mixing may be done in any suitable manner.

Similarly, the article of manufacture can be made in any suitable manner. For example, suitable forms or molds in the shape of a hand are heated in an oven, and are optionally immersed or dipped into a coagulant. A suitable coagulant includes, for example, a solution of a metal salt, preferably calcium nitrate, in water or alcohol. The form is then withdrawn from the coagulant, and the excess li uid is permitted to dry. As a result, a residual coating of coagulant is left on the form. The form coated with the coagulant is then immersed or dipped into the polymer latex composition of the present invention. The latex coagulates and forms a film on the form. The amount of time the form is immersed in the latex typically determines the thickness of the film. The longer the dwell time, the thicker the film.

The form is then removed from the latex, and is immersed in a water bath to remove the coagulant and some of the surfactant. The latex coated form is then placed in a drying oven at a temperature preferably between about 60° C. and about 100° to remove water from the film. When the film is dry, the mold is placed in a curing oven preferably at a temperature between about 100° C. and 170° C. for about 5 to about 30 minutes. If desired, the same oven can be used for drying and curing, and the temperature can be increased with time.

The cured glove is removed from the form. It may be powdered or postprocessed for ease of removal and for ease of donning. The glove preferably has a thickness ranging from about 3 mil to about 20 mil.

The crosslinked film and glove formed in accordance with the present invention may have various physical properties. Preferably, the above materials have a tensile strength of at least about 1000 psi, an elongation of at least about 300 percent, and a modulus at 100 percent elongation of no more than about 1000 psi. More preferably, the materials have a tensile strength of at least about 1400 psi, an elongation of at least about 400 percent, and a modulus at 100 percent elongation of no more than about 500 psi.

In addition to the above, the crosslinked film and article of manufacture produced in accordance with the invention can contain additional (at least a second) polymeric films in contact thereto so as to form composite structures. The application of the additional polymeric films may be achieved by techni ues which are known in the art. For example, the polymeric films may be formed on the crosslinked film and article by coating, spraying, or "overdipping". The resulting materials may then be dried and cured in accordance with known and accepted techni ues. The additional polymeric films may be formed from a wide number of materials including, but not limited to, neoprene, nitrites, urethanes, acrylics, polybutadiene, polyisoprene, and the like. Mixtures of the above may also be used. The additional polymeric films may be present in a variety of configurations. For example, in one embodiment, an additional film may be positioned above the crosslinked film. In a second embodiment, an additional film may be positioned below the crosslinked film. In a third embodiment, the crosslinked film may be located between two additional films. The configurations of different films may be selected as desired by the skilled artisan.

The crosslinked film of the invention may be used in conjunction with other conventional materials, such as textile substrate which may be present in the form of an article such as a glove, for example. As an example, supported gloves are well known in the art. In this instance, the crosslinked film typically covers or is lined by the textile substrate, although other configurations are possible. For the purposes of the invention, the term "textile" is to be broadly interpreted and may be formed from a variety of synthetic and natural materials such as, but not limited to, nylon, polyester, and cotton. Blends and mixtures thereof may also be used.

The following examples are merely illustrative of the invention, and are not limiting thereon.

EXAMPLE 1

150 phm (parts per hundred monomer) of demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.1 phm of tetrapotassium pyrophosphate, 0.6 phm tert-dodecylmercaptan, 70 phm of 1,3-butadiene, 25 phm methyl methacrylate, and 5 phm of methacrylic acid were charged to a reactor. The temperature of the reactor contents was raised to 52° C. and 0.25 phm potassium persulfate added. After 6.25 hours, 0.25 phr of 2,5 di-tert-amylhydro uinone and ammonium hydroxide sufficient to raise the pH of the reactor contents to 7.1 were added. Conversion was determined to be 92.1 percent. The latex was concentrated and ammonium hydroxide was added to raise the pH to 7. The solids of the concentrated latex was determined to be 43.5 percent. It had a viscosity of 330 cPs.

The latex was compounded by diluting to 30 percent solids with demineralized water and 0.5 phr (parts per hundred rubber) sodium salt of linear dodecylbenzene sulfonic acid, 1 phr Rotec SPL, and ammonium hydroxide to raise the pH to 8.5 were added. Zinc dibutyl dithiocarbamate (0.25phr), sulfur (0.5 phr), and zinc oxide (3 phr) were then added.

EXAMPLE 2

A latex was prepared as in Example 1 with 25 phm n-butyl acrylate used in place of the methyl methacrylate. The 2,5 di-tert-amylhydro uinone was added after 7 hours and the pH adjusted to 7 with ammonium hydroxide. Conversion was determined to be 92.4 percent. It was concentrated and pH adjusted to 7 yielding a final latex with 43.7 percent solids and a viscosity of 1010 cPs.

The latex was compounded as in Example 1.

EXAMPLE 3

150 phm of demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.2 phm of tetrapotassium pyrophosphate, 0.6 phm tert-dodecylmercaptan, 70 phm of 1,3-butadiene, 25 phm methyl methacrylate, and 5 phm of methacrylic acid were charged to a reactor. The temperature of the reactor contents was raised to 52° C. and 0.03. phm potassium persulfate added. After 15 hours, 0.25 phr 2,5 di-tert-amylhydro uinone and ammonium hydroxide to raise the pH to 8.5 were added. Conversion was determined to be 96.7 percent. The latex was concentrated, ammonium hydroxide was added to raise the pH to 7, and the solids content was determined to be 43.2 percent. It had a viscosity of 60 cPs. The latex was compounded by adding 0.5 phr sodium salt of linear dodecylbenzene sulfonic acid, zinc dibutyl dithiocarbamate (0.25 phr), sulfur (0.5 phr). and zinc oxide (3 phr) were then added. This latex compound will be referred as the "high zinc compound". A second compound was also made from the uncompounded latex (the "low zinc compound") by adding 0.5 phr sodium salt of linear dodecylbenzene sulfonic acid, zinc dibutyl dithiocarbamate (0.25 phr), sulfur (0.5 phr), and zinc oxide (1.5 phr.)

EXAMPLE 4

150 phm of demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.2 phm of tetrapotassium pyrophosphate, 0.12 phm tert-dodecylmercaptan, 14 phm of 1,3-butadiene, 5 phm methyl methacrylate and 1 phm of methacrylic acid were charged to a reactor. The temperature of the reactor contents was raised to 130° F. and 0.25 phm potassium persulfate added. After allowing the reactor contents to react for 1 hour, a mixture of 56 phm 1,3-butadiene, 20 phm methyl methacrylate 0.48 phm tert-dodecylmercaptan and 4 phm methacrylic acid was metered in to the reactor over a 6 hour period. After 8.5 hours, 0.25 phr, 2,5 di-tert-amylhydro uinone and ammonium hydroxide to raise the pH of the reactor contents to 7.6 were added. Conversion was determined to be 98.6 percent. The latex was concentrated to 44.1 percent solids, and ammonium hydroxide was added to raise the pH to 7.5. It had a viscosity of 580 cPs.

A portion of the latex was taken and compounded by added 1 phr of the sodium salt of linear dodecylbenzene sulfonic acid, 1 phr Rotec SPL, and ammonium hydroxide to a pH of 8.5. To this 0.5 phr of the sodium salt of linear dodecylbenzene sulfonic acid. 0.25 phr of zinc dibutyl dithiocarbamate, 0.5 phr sulfur, and 1.5 phr zinc oxide, and demineralized water to reduce the solids content to 30 percent were added. This will be referred to as "Compound 1". A second portion of the latex was compounded using 1 phr of the disodium salt of benzenesulfonic acid dodecyloxydi-, 1 phr Rotec SPL, and ammonium hydroxide to a pH of 8.4 to 8.8. To this, 0.5 phr of the disodium salt of benzenesulfonic acid, dodecyloxydi-, 0.25 phr of zinc dibutyl dithiocarbamate, 0.5 phr sulfur, and 1.5 phr zinc oxide, and demineralized water to reduce the solids content to 30 percent were added. This will be referred to as "Compound 2".

EXAMPLE 5

Latex compound made as described in Example 1 was coagulated into films on metal plates by preheating the metal plates to 70° C. and then immersing the metal plates into 35 percent ethanolic calcium nitrate coagulant solution. The plates were partially dried and then immersed into the latex and removed after building a film of approximately 10 mils. The plates were allowed to air dry for 60 seconds and then placed in a bath of warm flowing water for 4 minutes. The plates were then placed in a 70° C. oven for 1 hour and then a 132° C. oven for 15 minutes. The plates were then allowed to cool and the films removed. Tensile properties were measured using ASTM D-412 and are given below in Table 1.

EXAMPLE 6

Films of the latex compound described in Example 2 were made using the procedures described in Example 5. Tensile properties were measured using ASTM D-412 and are given below in Table 1.

EXAMPLE 7

Films of the latex compounds described in Example 3 were made using the procedures described in Example 5. Tensile properties were measured using ASTM D-412 and are given below in Table 1. Measurements are given for the high zinc compound and for the low zinc compound.

EXAMPLE 8

Films of the latex compounds described in Example 4 were made using the procedures described in Example 5, except films of approximately 7 mils were obtained. Tensile properties were measured using ASTM D-412 and are given below in Table 1.

EXAMPLE 9

150phm of demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.2 phm of tetrapotassium pyrophosphate, 0.6 phm tert-dodecylmercaptan, 70 phm of 1,3-butadiene, 25 phm methyl methacrylate, and 5 phm of methacrylic acid were charged to a reactor. The temperature of the reactor contents was raised to 52° C. and 0.03 phm potassium persulfate added. After 12 hours, ammonium hydroxide to raise the pH to 8.5 was added. Conversion was determined to be 97.1 percent. The latex was concentrated and ammonium hydroxide was added to raise the pH to 7.5. The solids content of the concentrated latex was determined to be 43.7 percent.

Latex was compounded by adding 1 phr sodium salt of linear dodecylbenzene sulfonic acid, 1 phr Rotec SPL, and ammonium hydroxide to take the pH to 8.5 were added. This viscosity was 40 cPs.

A portion of this latex was compounded with 0.5 phr sodium salt of linear dodecylbenzene sulfonic acid, zinc dibutyl dithiocarbamate (0.25 phr), sulfur (0.5 phr), zinc oxide (1.5 phr) and titanium dioxide (1.5 phr) to give "low zinc cure compound". A second portion of this latex was compounded with 0.5 phr sodium salt of linear dodecylbenzene sulfonic acid, zinc dibutyl dithiocarbamate (0.5 phr), sulfur (1 phr), zinc oxide (3 phr) and titanium dioxide (1.5 phr) to give a "high zinc cure compound".

EXAMPLE 10

Films of the latex compounds described in Example 9 were made using the procedures described in Example 5. Tensile properties were measured using ASTM D-412 along with $T_g$ and stress retention values as outlined in U.S. Pat. No. 5,014,362 to Tillotson et al. and are given below in Table 1.

TABLE 1

| Example | M100 | M200 | M300 | M400 | M500 | $T_b$ | E % | S.R. % | $T_g$ |
|---|---|---|---|---|---|---|---|---|---|
| 5 | 384 | 535 | 794 | 1254 | 2117 | 3415 | 585 | | |
| 6 | 258 | 360 | 510 | 740 | 1114 | 3007 | 730 | | |
| 7 (high Zn) | 267 | 367 | 522 | 812 | 1412 | 4071 | 670 | | |
| 7 (low Zn) | 172 | 219 | 278 | 338 | 430 | 2049 | 787 | | |
| 8 (Cmpd 1) | 148 | 188 | 238 | 307 | 384 | 1720 | 825 | | |
| 8 (Cmpd 1) | 144 | 184 | 237 | 312 | 395 | 1483 | 855 | | |
| 10 (high Zn) | 186 | | | | 543 | 2187 | 751 | 43 | −58 |
| 10 (low Zn) | 337 | | | | 1877 | 3308 | 594 | 38 | −57 |

Several of these films give physical properties complying with standards for surgical or exam gloves as outlined in ASTM D3577 and D3578 respectively.

EXAMPLE 11

145.15 phm demineralized water, 2.75 phm of the sodium salt of linear dodecylbenzene sulfonic acid, 0.05 phm of ammonium salt of ethylenediaminetetraacetic acid. 0.1 phm of the sodium salt of condensed naphthalene sulfonic acid, 0.1 phm of tetrapotassium pyrophosphate, 0.6 phm tert-dodecylmercaptan, 70 phm of 1,3-butadiene, 25 phm methyl acrylate, and 5 phm of methacrylic acid were charged to a reactor. The temperature of the reactor contents was raised to 52° C. and 0.15 phm potassium persulfate added. After 5 hours, the temperature was raised to 54° C.; 9 hours after the potassium persulfate was added, 0.25 phm 2,5 di-tert-amylhydro uinone and 0.14 phm ammonium hydroxide were added and the reaction mixture cooled to room temperature. Conversion was determined to be 90.9 percent. The latex was concentrated to 43.4 percent solids and ammonium hydroxide was added to raise the pH to 7.1. The viscosity was 170 cPs.

The latex was compounded by adding 1.5 phr of the sodium salt of linear dodecylbenzene sulfonic acid, 0.5 phr antioxidant, ammonium hydroxide to raise the pH to 8.5, zinc dibutyl dithiocarbamate (0.25 phr), sulfur (0.5 phr) and zinc oxide (1.75 phr).

EXAMPLE 12

145.15 phm demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.1 phm of tetrapotassium pyrophosphate, 0.6 phm tert-dodecylmercaptan, 45 phm of 1,3-butadiene, 50 phm methyl methacrylate, and 5 phm of methacrylic acid were charged to a reactor. The temperature of the reactor contents was raised to 52° C. and 0.15 phm potassium persulfate added. After 5 hours, 0.14 phm of ammonium hydroxide was added to the reactor and the reaction mixture cooled to room temperature. Conversion was determined to be 92.7 percent. The latex was concentrated to 43.7 percent solids and ammonium hydroxide was added to raise the pH to 7.4. The viscosity was 40 cPs.

The latex was compounded by adding 1.5 phr of the sodium salt of linear dodecylbenzene sulfonic acid, 0.5 phr antioxidant, ammonium hydroxide to raise the pH to 8.5, zinc dibutyl dithiocarbamate (0.25 phr), sulfur (0.5 phr) and zinc oxide (1.75 phr)

EXAMPLE 13

145.15 phm demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.1 phm of tetrapotassium pyrophosphate, 0.6 phm tert-dodecylmercaptan, 45 phm of 1,3-butadiene, 30 phm methyl methacrylate, 20 phm n-butyl acrylate and 5 phm of methacrylic acid were charged to a reactor. The temperature of the reactor contents was raised to 52° C. and 0.15 phm potassium persulfate added. After 7.5 hours, 0.25 phm 2,5 di-tert-amylhydro uinone and 0.14 phm ammonium hydroxide were added and the reaction mixture cooled to room temperature. Conversion was determined to be 93.2 percent. The latex was concentrated to 43.5 percent solids and ammonium hydroxide was added to raise the pH to 7.2. The viscosity was 60 cPs.

The latex was compounded by adding 1.5 phr of the sodium salt of linear dodecylbenzene sulfonic acid, 0.5 phr antioxidant, ammonium hydroxide to raise the pH to 8.5, zinc dibutyl dithiocarbamate (0.25 phr), sulfur (0.5 phr) and zinc oxide (1.75 phr).

EXAMPLE 14

145.15 phm demineralized water, 2.75 phm of the sodium salt of linear dodecylbenzene sulfonic acid, 0.05 phm of ammonium salt of ethylenediaminetetraacetic acid, 0.1 phm of the sodium salt of condensed naphthalene sulfonic acid, 0.1 phm of tetrapotassium pyrophosphate, 0.6 phm tert-dodecylmercaptan 78 phm of 1,3-butadiene, 16 phm methyl methacrylate, 6 phm of methacrylic acid were charged to a reactor. The temperature of the reactor contents was raised to 52° C. and 0.15 phm potassium persulfate added. After 7.5 hours, 0.25 phm 2,5 di-tert-amylhydro uinone and 0.14 phm ammonium hydroxide were added and the reaction mixture cooled to room temperature. Conversion was determined to be 90.7 percent. The latex was concentrated to 44.5 percent solids and ammonium hydroxide was added to raise the pH to 7.2. The viscosity was 420 cPs.

The latex was compounded by adding 1.5 phr of the sodium salt of linear dodecylbenzene sulfonic acid, 0.5 phr antioxidant, ammonium hydroxide to raise the pH to 8.5, zinc dibutyl dithiocarbamate (0.25 phr), sulfur (0.5 phr) and zinc oxide (1.75 phr).

EXAMPLE 15

145.15 phm demineralized water, 2,75 phm of the sodium salt of linear dodecylbenzene sulfonic acid. 0.05 phm of ammonium salt of ethylenediaminetetraacetic acid, 0.1 phm of the sodium salt of condensed naphthalene sulfonic acid, 0.1 phm of tetrapotassium pyrophosphate, 0.6 phm tert-dodecylmercaptan 70 phm of 1,3-butadiene, 28 phm methyl methacrylate, 2 phm of methacrylic acid were charged to a reactor. The temperature of the reactor contents was raised to 52° C. and 0.15 phm potassium persulfate added. After 6 hours the temperature of the reactor contents was raised to 54° C. After 10 hours, 0.25 phm 2,5 di-tert-amylhydro uinone and 0.14 phm ammonium hydroxide were added to the reaction mixture and it was cooled to room temperature. Conversion was determined to be 91.1 percent. The latex was concentrated to 43.6% solids and ammonium hydroxide added to raise the pH to 7.6. The viscosity was 270 cPs.

The latex was compounded by adding 1.5 phr of the sodium salt of linear dodecylbenzene sulfonic acid, 0.5 phr antioxidant, ammonium hydroxide to raise the pH to 8.5, zinc dibutyl dithiocarbamate (0.25 phr), sulfur (0.5 phr) and zinc oxide (1.75 phr).

EXAMPLE 16

145.15 phm demineralized water, 2,75 phm of the sodium salt of linear dodecylbenzene sulfonic acid. 0.05 phm of ammonium salt of ethylenediaminetetraacetic acid, 0.1 phm of the sodium salt of condensed naphthalene sulfonic acid, 0.1 phm of tetrapotassium pyrophosphate, 0.6 phm tert-dodecylmercaptan 70 phm of 1,3-butadiene, 22 phm methyl methacrylate, 8 phm of methacrylic acid were charged to a reactor. The temperature of the reactor contents was raised to 52° C. and 0.15 phm potassium persulfate added. After 5.75 hours, 0.25 phm 2,5 di-tert-amylhydro uinone and 0.14 phm ammonium hydroxide were added and the reaction mixture cooled to room temperature. Conversion was determined to be 90.3 percent. The latex was concentrated to 43.6 percent solids and ammonium hydroxide was added to raise the pH to 7. The viscosity was 50 cPs.

The latex was compounded by adding 1.5 phr of the sodium salt of linear dodecylbenzene sulfonic acid, 0.5 phr antioxidant, ammonium hydroxide to raise the pH to 8.5, zinc dibutyl dithiocarbamate (0.25 phr), sulfur (0.5 phr) and zinc oxide (1.75 phr).

EXAMPLE 17

Films of the compound described in Example 11 were made following the procedure described in Example 5, except films of approximately 5 mil were obtained. Tensile properties were measured using ASTM D-412 and are given below:

EXAMPLE 18

Films of the compound described in Example 12 were made following procedure described in Example 5, except films of approximately 5 mil were obtained. Tensile properties were measure using ASTM D-412 and are given below in Table 2.

EXAMPLE 19

Films of the compound described in Example 13 were made following the procedure described in Example 5, except films of approximately 5 mil were obtained. Tensile properties were measured using ASTM D-412 and are given below in Table 2.

EXAMPLE 20

Films of the compound described in Example 14 were made following the procedure described in Example 5, except films of approximately 5 mil were obtained. Tensile properties were measured using ASTM D-412 and are give below in Table 2.

EXAMPLE 21

Films of the compound described in Example 15 were made following the procedure described in Example 5, except films of approximately 5 mil were obtained. Tensile properties were measured using ASTM D-412 and are give below in Table 2.

EXAMPLE 22

Films of the compound described in Example 16 were made following the procedure described in Example 5, except films of approximately 5 mil were obtained. Tensile properties were measured using ASTM D-412 and are given below in Table 2.

TABLE 2

| Example | M100 | M200 | M300 | M400 | M500 | $T_b$ | E % | $T_g$* |
|---|---|---|---|---|---|---|---|---|
| 17 | 197 | 267 | 357 | 506 | 762 | 3037 | 728 | −60 |
| 18 | 453 | 878 | 1506 | 3120 |  | 4697 | 445 | −17 |
| 19 | 258 | 421 | 673 | 1118 | 1864 | 2590 | 548 | −31 |
| 20 | 241 | 348 | 502 | 757 | 1242 | 3946 | 675 | −64 |
| 21 | 117 | 147 | 180 | 222 | 285 | 1194 | >900 | −54 |
| 22 | 247 | 365 | 543 | 843 | 1414 | 2833 | 616 | −54 |

*The $T_g$ values in Table 2 are for the dry uncompounded latex

In the specification and examples, there have been disclosed typical preferred embodiments of the invention and, although specific terms are employed, they are used in a generic and descriptive sense only and not for purposes of limitation of the scope of the invention being set forth in the following claims.

What is claimed is:

1. A glove formed from a polymer latex, the polymer latex comprising:
    (a) from about 35 to about 80 percent of aliphatic conjugated diene monomer;
    (b) from about 15 to about 50 weight percent of unsaturated ester or amide monomer; and
    (c) from about 0.1 to about 15 weight percent of unsaturated acid monomer.

2. The glove according to claim 1, wherein the aliphatic conjugated diene monomer is a $C_4$ to $C_9$ diene.

3. The glove according to claim 2, wherein the $C_4$ to $C_9$ diene is 1,3-butadiene.

4. The glove according to claim 1, wherein the unsaturated acid monomer is selected from the group consisting of monomers of monocarboxylic, dicarboxylic, and a partial ester or amide of unsaturated polycarboxylic acids and salts thereof.

5. The glove according to claim 4, wherein the mono or dicarboxylic acid monomer is selected from the group consisting of monomers of acrylic acid, methacrylic acid, itaconic acid, fumaric acid, and maleic acid and salts thereof.

6. The glove according to claim 4, wherein the partial ester or amide of unsaturated polycarboxylic acid monomer has the formula RXOC—CH=CH—COOH, where R is a $C_1$ to $C_{18}$ aliphatic, alicyclic or aromatic group and X is an oxygen atom or a NR' group, where R' represents a hydrogen atom or R group, or is a partial ester or amide of itaconic acid having $C_1$ to $C_{18}$ aliphatic, alicyclic or aromatic groups.

7. The glove according to claim 1, wherein the unsaturated ester or amide monomer is a (meth)acrylic acid derivative.

8. The glove according to claim 1, further comprising a blend of the polymer latex composition with a component selected from the group consisting of urethanes, epoxies, styrenic resins, acrylic resins, melamine-formaldehyde resins and conjugated diene polymers and blends and mixtures thereof.

9. A method for making an article of manufacture, the method comprising the steps of:
(a) contacting a mold in the shape of the article of manufacture with a polymer latex composition comprising from about 35 to about 80 weight percent of aliphatic conjugated diene monomer, from about 15 to about 65 percent weight percent of unsaturated ester or amide monomer, and above 0 to about 15 weight percent of unsaturated acid monomer; and
(b) curing the polymer latex composition which is present on the mold to form the article of manufacture.

10. The method according to claim 9, wherein the aliphatic conjugated diene monomer is a $C_4$ to $C_9$ diene.

11. The method according to claim 10, wherein the $C_4$ to $C_9$ diene is 1,3-butadiene.

12. The method according to claim 9, wherein the unsaturated acid monomer is selected from the group consisting of monomers monocarboxylic, dicarboxylic, and a partial ester or amide of unsaturated polycarboxylic acids and salts thereof.

13. The method according to claim 12, wherein the mono or dicarboxylic acid monomer is selected from the group consisting of monomers of acrylic acid, methacrylic acid, itaconic acid, fumaric acid, and maleic acid and salts thereof.

14. The method according to claim 12, wherein the partial ester or amide of unsaturated polycarboxylic acid monomer has the formula RXOC—CH=CH—COOH, where R is a $C_1$ to $C_{18}$ aliphatic, alicyclic or aromatic group and X is an oxygen atom or a NR' group, where R' represents a hydrogen atom or R group, or is a partial ester or amide of itaconic acid having $C_1$ to $C_{18}$ aliphatic, alicyclic or aromatic groups.

15. The method according to claim 9, wherein the unsaturated ester or amide monomer is a (meth)acrylic acid derivative.

16. The method according to claim 9, further comprising a blend of the polymer latex composition with a component selected from the group consisting of urethanes, epoxies, styrenic resins, acrylic resins, melamine-formaldehyde resins and conjugated diene polymers and blends and mixtures thereof.

* * * * *